United States Patent
Gu et al.

(10) Patent No.: US 7,206,784 B2
(45) Date of Patent: **\*Apr. 17, 2007**

(54) METHOD AND APPARATUS FOR PERFORMING MULTIPLE MERGE OPERATIONS USING SOURCE DATA THAT IS MODIFIED IN BETWEEN THE MERGE OPERATIONS

(75) Inventors: Richard Yu Gu, Mountain View, CA (US); Harmeek Singh Bedi, Foster City, CA (US); Ashish Thusoo, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 10/447,863

(22) Filed: May 28, 2003

(65) Prior Publication Data

US 2004/0243589 A1 Dec. 2, 2004

(51) Int. Cl.
*G06F 7/00* (2006.01)
*G06F 17/00* (2006.01)
(52) U.S. Cl. .................... 707/100; 707/101
(58) Field of Classification Search ........ 707/1–10, 707/101–104, 100; 715/503
See application file for complete search history.

(56) References Cited

U.S. PATENT DOCUMENTS

| | | | |
|---|---|---|---|
| 5,619,713 A | 4/1997 | Baum et al. | |
| 5,832,475 A | 11/1998 | Agrawal et al. | 707/2 |
| 5,903,887 A | 5/1999 | Kleewein et al. | |
| 6,092,062 A | 7/2000 | Lohman et al. | |
| 6,167,405 A | 12/2000 | Rosensteel, Jr. et al. | 707/102 |
| 6,169,794 B1 | 1/2001 | Oshimi et al. | 379/207 |
| 6,282,533 B1 | 8/2001 | Ramaswamy et al. | 707/2 |
| 6,341,281 B1 | 1/2002 | MacNicol et al. | |
| 6,356,891 B1 | 3/2002 | Agrawal et al. | |
| 6,397,204 B1 * | 5/2002 | Liu et al. | 707/2 |
| 6,493,727 B1 * | 12/2002 | Huang et al. | 707/201 |
| 6,678,691 B1 * | 1/2004 | Kikkers | 707/102 |
| 6,684,215 B1 * | 1/2004 | Saracco | 707/100 |
| 6,721,742 B1 | 4/2004 | Uceda-Sosa et al. | 707/10 |
| 6,850,952 B2 * | 2/2005 | Tse et al. | 707/102 |
| 6,879,984 B2 | 4/2005 | Duddleson et al. | 707/101 |
| 6,895,471 B1 * | 5/2005 | Tse et al. | 711/118 |
| 6,917,933 B2 | 7/2005 | Craig et al. | |

(Continued)

OTHER PUBLICATIONS

Barclay, T. et al., "Loading Databases Using Dataflow Parallelism", *Sigmond Record*, vol. 23, No. 4 (1994) pp. 72-83.

(Continued)

*Primary Examiner*—Mohammad Ali
*Assistant Examiner*—Shew-Fen Lin
(74) *Attorney, Agent, or Firm*—Hickman Palermo Truong & Becker LLP

(57) ABSTRACT

A method for performing multiple merge operations with a source data structure and a plurality of destination data structures, in which the source data structure is scanned one time in order to obtain source data that is then used for multiple merge operations. The source data is then used consecutively in order to merge the source data into the one or more destination data structures. Each merge is performed using the same scan of the source data structure and within the same execution of a database command.

10 Claims, 10 Drawing Sheets

U.S. PATENT DOCUMENTS

| | | | |
|---|---|---|---|
| 6,952,692 B1 * | 10/2005 | Bhattiprolu et al. | 707/3 |
| 7,062,481 B2 | 6/2006 | Pham et al. | |
| 2002/0059299 A1 | 5/2002 | Spaey | 707/104.1 |
| 2003/0061244 A1 * | 3/2003 | Hirohata | 707/200 |
| 2003/0065477 A1 * | 4/2003 | Opdyke | 702/179 |
| 2004/0049730 A1 * | 3/2004 | Ishizaka | 715/503 |
| 2004/0199535 A1 | 10/2004 | Zuk | 707/102 |
| 2005/0076046 A1 * | 4/2005 | Goldsack | 707/101 |

OTHER PUBLICATIONS

Lehner, Wolfgang, "fAST Refresh using Mass Query Optimization" *2001 IEEE*, pp. 391-398.

Barclay et al., "Loading Databases Using Dataflow Parallelism" (1994) pp. 1-16.

Lorie et al., "A Low Communication Sort Algorithm for a Parallel Database Machine" *IBM Almaden Research Center* (1989) pp. 1-17.

Wilkinson et al., "Parallel Programming" *Alan APT* (1999) pp. 139-156.

* cited by examiner

METHOD AND APPARATUS FOR PERFORMING MULTIPLE MERGE OPERATIONS USING SOURCE DATA THAT IS MODIFIED IN BETWEEN THE MERGE OPERATIONS

CROSS REFERENCE TO RELATED APPLICATIONS

This application is related to U.S. patent application Ser. No. 10/447,862, entitled METHOD AND APPARATUS FOR PERFORMING MULTI-TABLE MERGE OPERATIONS IN A DATABASE ENVIRONMENT, by RICHARD YU GU, HARMEEK SINGH BEDI and ASHISH THUSOO, filed on May 28, 2003, the content of which is hereby incorporated by reference in its entirety.

This application is related to U.S. patent application Ser. No. 10/447,866, entitled PIPLELINE MERGE OPERATIONS USING SOURCE DATA AND MULTIPLE DESTINATION DATA STRUCTURES, by RICHARD YU GU, HARMEEK SINGH BEDI and ASHISH THUSOO, filed on May 28, 2003, the content of which is hereby incorporated by reference in its entirety.

This application is related to U.S. patent application Ser. No. 10/447,864, entitled TECHNIQUE FOR USING A CURRENT LOOKUP FOR PERFORMING MULTIPLE MERGE OPERATIONS USING SOURCE DATA THAT IS MODIFIED IN BETWEEN THE MERGE OPERATIONS, by RICHARD YU GU, HARMEEK SINGH BEDI and ASHISH THUSOO, filed on May 28, 2003, the content of which is hereby incorporated by reference in its entirety.

FIELD OF THE INVENTION

The present invention relates to database operations and management. In particular, the invention relates to a method and apparatus for performing multi-table merge operations in a database environment.

BACKGROUND OF THE INVENTION

In a data warehouse environment, tables need to be refreshed periodically with new data arriving from client systems. The new data may contain changes to existing records, i.e., rows in tables, of the database and/or new records that need to be inserted.

A data manipulation operation is defined as an operation, which modifies a data set. Examples of data manipulation operations in Structured Query Language (SQL) include UPDATE, INSERT, DELETE, and MERGE. In the context of our invention, we consider those forms of data manipulation operations where a source data set is compared with a destination data set in order to generate modifications to the latter. This can be achieved today through UPDATE, INSERT, DELETE, and MERGE statements. All these statements modify a single target data set. Such statements have been used with, for example, the Oracle 9i database system.

Another feature, provided by the SQL statement MERGE, combines a conditional INSERT, UPDATE and DELETE commands in a single atomic statement to merge data from a source to a destination. The INSERT, UPDATE, DELETE commands in the context of MERGE command are considered conditional in that (a) if a record in the new data corresponds to an item that already exists in the destination, then an UPDATE and possibly DELETE operations are performed on the item; and (b) if a record in the new data does not already exist in the destination, then an INSERT operation is performed to add a corresponding record to the destination.

Database application such as data warehouses often require data from a source structure to be merged into multiple destination structures. FIG. 10 illustrates a typical plan for a database system that merges data from a source table 1010 into multiple destination tables within the database system. The multiple destination tables are illustrated by a first destination table 1020 and a second destination table 1025. To perform the MERGE operations, a first source scan 1012 is performed on the source table 1010, and a first destination scan 1022 is performed on the first destination table 1020. The first source scan 1012 and first destination scan 1022 may be completed at time T0. Once the scans are performed, a first MERGE operation 1030 is performed to merge data from the source table 1010 into the first destination table 1020. The first MERGE operation 1030 determines, for each row being merged into the destination table, whether the row corresponds to a row that is already in the destination table.

To perform the second MERGE operation 1040, a second source scan 1014 is performed on source table 1010. A second destination scan 1024 is also performed on second destination table 1025. The second source scan 1014 and the second destination scan 1024 are completed at time T1. Once the scans are completed, the second MERGE operation 1040 is performed.

The plan of FIG. 10 illustrates the manner in which successive MERGE operations between a source data structure and other destination data structures are typically performed. Each MERGE operation requires a scan of the source data structure. This can be problematic when the source data structure is large, or otherwise be sufficiently complex to require an expensive and lengthy process to be scanned. As a result, when the source data structure is subjected to multiple MERGE operations, the individual MERGE operation can consume significant computational resources for a lengthy period of time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
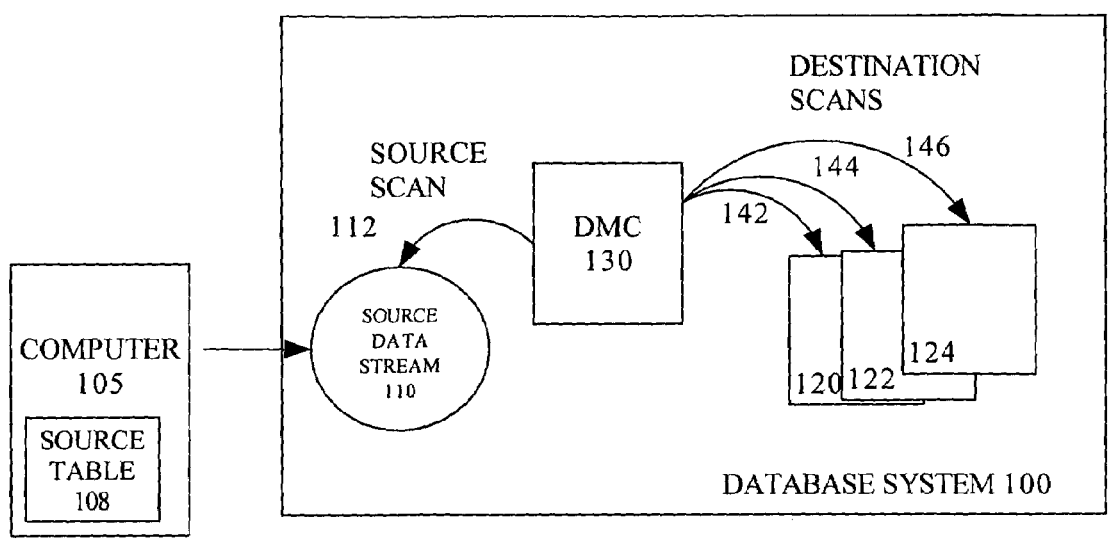
FIG. 1 is a block diagram of a database system configured according to an embodiment of the invention.

A method and apparatus for performing multi-table merge operations are described. In the following description, for the purposes of explanation, numerous specific details are set forth in order to provide a thorough understanding of the present invention. It will be apparent, however, that the invention may be practiced without these specific details. In other instances, well-known structures and devices are shown in block diagram form in order to avoid unnecessarily obscuring the invention.

General Overview

A merge operation is a data manipulation operation that refers to a process where two sets of data are compared and possibly combined. If the result of the comparison is that the two sets of data are equivalent, then the result of the data manipulation operation may be that neither set of data is modified. If a difference is determined, then the result of the operation may be that one set of data is modified based on the other set of data. In the context of database operations, each merge includes identifying differences between data from the source data stream and data from one of the destination data structures, and then modifying that destination data structure based on the identified differences, if any. Examples of merge operations (or other data manipulation operations) in SQL include UPDATE, INSERT, DELETE and MERGE. Throughout much of this application, the specific data manipulation operation discussed is MERGE.

Embodiments described herein provide for performing multiple merge operations to integrate data from a source data structure with one or more destination data structures. Only one scan of the source data structure is necessary to obtain the source data for performing all of the merge operations. Embodiments such as described herein conserve substantial processing resources and time by enabling multiple-merge operations to be performed using only a single scan of the source data structure.

According to one embodiment, data from a source data structure is combined with multiple destination data structures using a single scan of the source data structure, where the data structures involved in the merge operation are relational data structures. In an embodiment, a plurality of merge operations are performed to combine a source data stream obtained from the source data structures with data from one or more of the destination data structures, but the same scan of the source data structure is used to obtain the source data stream that is the basis for performing all of the merge operations.

According to another method, a merge operation is performed to merge a source data stream into a first destination data structure. The merge operation augments changes to the source data stream for use in subsequent merge operation. In one embodiment, the source data stream is stored with its changes in one or more intermediate data structure during performance of the merge operations. A determination is made at the intermediate data structure to determine how the source data is to be modified for subsequent merge operations.

In another embodiment, the source data stream, which may have been modified by the first merge operation, is pipelined to the subsequent merge operations. As a result of this, multiple merge operations are active on different portions of the source stream at the same time.

According to another embodiment, a plurality of merge operations is performed using a single scan of a source data structure. Each of the merge operations is an operation to merge or otherwise combine a source data stream into at least one of a plurality of destination data structures. The performance of at least one of the plurality of merge operations causes data from the source data stream to be augmented for subsequent merge operations.

System Description

FIG. 1 illustrates a database system configured according to an embodiment. A database system 100 such as shown by FIG. 1 may correspond to systems, which communicate with numerous external data sources to combine data into a centralized source. An example of such a system is ORACLE WAREHOUSE BUILDER, manufactured by ORACLE CORP.

In an embodiment, database system 100 includes a database management component (DMC) 130. The DMC 130 illustrates components and resources of the database system 100 which are used to receive data from external sources and to merge external data into internal data structures of the database system. In an embodiment, the internal data structures managed by the DMC 130 are in the form of tables. In an example provided by FIG. 1, the destination data structures include a first destination table 120, a second destination table 122, and a third destination table 124. In one embodiment, data may be imported into the database system 100 from an external data source 105. The external data source 105 may correspond to another database system, computer system, storage device, or computer-readable memory that can provide data to database system 100.

In FIG. 1, a set of source data 110 is received from the external data source 105. The source data 110 may correlate to data copied from a source table 108 (or other relational data structure) residing within the external data source 105. The DMC 130 merges source data 110 into destination tables 120, 122, and 124. The DMC 130 merges the source data 110 by performing a series of MERGE operations to combine the source data with each of the destination tables 120, 122 and 124. In one embodiment, each MERGE operation between the source data 110 and one of the destination tables 120, 122, and 124 results in data being updated or inserted in one or both of the source data 110 and the corresponding destination table. To perform the MERGE operations, the DMC 130 scans each of the destination tables 120, 122 and 124, and the source table 108. The scan of the source table 108 results in the source data 110, which is then used for the subsequent MERGE operations. The source data 110 may be in the form of a stream. As will be described with some embodiments of the invention, the source data 110 may mutate or otherwise be modified in between subsequent MERGE operations.

According to an embodiment, the DMC performs a single scan of the source table 108 in order to merge data from the source table into each of the destination tables 120, 122 and 124. A scan 112 of the source table 110 may be performed to obtain the source data 110 prior to any of the MERGE operations being executed. A first destination scan 142 of the first destination table 120 is performed to merge some or all of the source data 110 into the first destination table 120. A second destination scan 144 of the second destination table 122 is performed in order to perform a second MERGE operation where the source data is merged into the second destination table 122. In performing the second MERGE operation, another scan of the source table 110 is not performed. A third MERGE operation may be performed in order to combine the source data 10 with the third destination table 124. In performing the third MERGE operation, another scan of the source table 108 is not performed. In this way, a multi-table merge is performed using only the single scan 112 of the source table 108 that yielded the source data 110. The total number of scans used to perform the multi-table merge is n+1, wherein n is the number of destination tables being merged with the source table 110.

While FIG. 1 illustrates use of a multi-table MERGE operation with tables as source and destinations, other embodiments may use other forms of data structures. For example, in one embodiment, the source table 108 may be a relational data structure such as rows of data that are the result of a query to another table or relational data structure. Thus, the source data 110 may be in the form of a stream of query result from some relational data structure.

Multi-Table Merge

Figure 2:
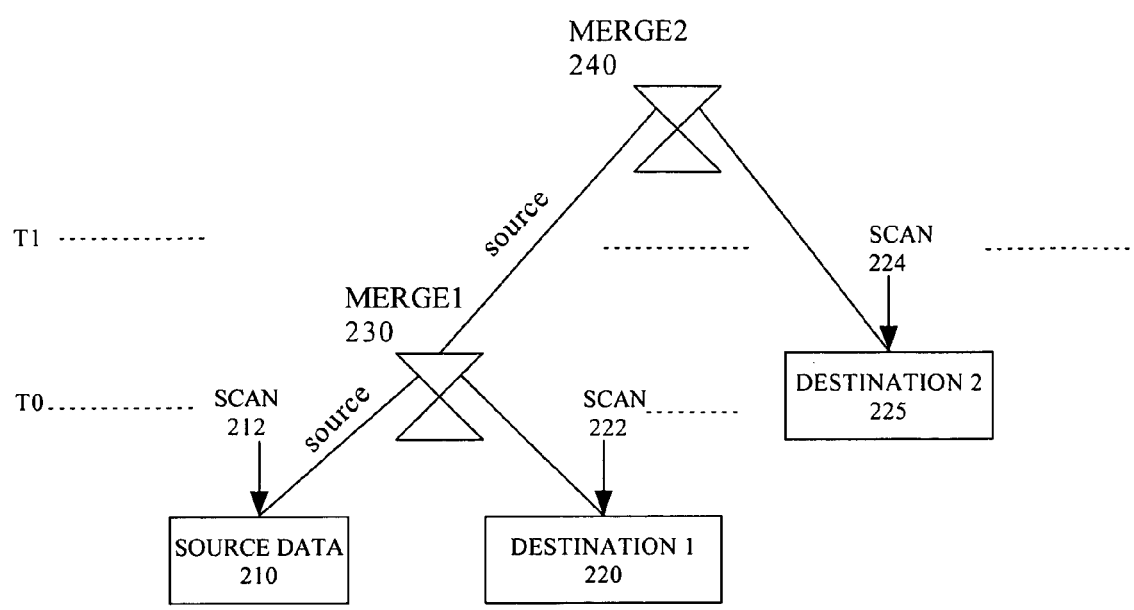
FIG. 2 illustrates a plan for performing a multi-table MERGE operation, under an embodiment of the invention.

FIG. 2 illustrates a plan for performing a multi-table merge, under an embodiment of the invention. In FIG. 2, source data 210 is combined with a data stream from a first destination table 220, and then with a second destination table 225. By time T0, a source scan 212 is performed to yield source data 210, and a first destination scan 222 of first destination table 220 is completed.

Once the source scan 212 and the first destination scan 222 are completed, a first MERGE operation 230 is performed. The first MERGE operation 230 includes operations that identify differences between source data 210 and first destination table 220. The first destination table 220 may be modified to account for the changes with the source data 210. In an embodiment such as described with FIG. 4, the source data stream generated from scan 212 can be augmented by the MERGE operation.

In an embodiment, a MERGE command may comprise two conditional commands: UPDATE and INSERT. In UPDATE, data in first destination table 220 is modified according to corresponding elements of source data 210. In INSERT, data from source data 210 is augmented and/or inserted to first destination table 220.

After first MERGE operation 230 is completed, a second destination scan 224 of second destination table 225 is completed at time T1. Another scan of source data 210 is not performed. Rather, second MERGE operation 240 is performed using the source scan 212 and the second destination scan 224. The second MERGE operation 240 may perform functions similar to the first MERGE operation 230.

Thus, an embodiment such as described with FIG. 2 preserves the source data 210 that results from source scan 212 for the subsequent MERGE operations. The source data stream from source scan 212 may be preserved by performing an "outer-join" operation before actually performing the MERGE operation. An outer-join operation is a type of join operation, where overlap between the source data 210 and the destination data structure is identified, except that the outer-join operation also preserves the source data.

Syntax for accomplishing one type of MERGE operation (the MERGE command) such as detailed in FIG. 2 is provided by a first set of instructions, illustrated below. This MERGE operation includes an outer-join operation:

```
10*  merge
20*    using <source>
30*    into <destination>
40*    on <predicate>
50*    when matched then
60*       update
70*          set <destination column>
80*    when not matched then
90*       insert <columns >
```

The syntax example provided above defines the source data and destination structures in lines 20 and 50. The "into" clause of line 30 causes the first destination table scan 222 to be performed. The "using" clause of line 20 causes the source table scan 212 to be performed. The "on" clause in line 40 defines the condition by which a comparison is made between the source data 210 and first destination table 220. For example, the "on" clause may specify that one or more column of first destination table 220 are to be matched to specified columns of source data 210. If the predicate of the "on" clause is true, then an update is performed in line 60 and 70 on the first destination table 220. The update consists of setting the destination columns in line 70 to a particular set of values defined by the specified columns of source data 210. If the predicate of the "on" clause is false, then an insert may be performed to augment the first destination table 220 with values derived from columns specified in the source data 210. The "on" clause may be implemented as an "outer join" operation that happens before the MERGE operation is performed. The outer-join is a join operation between the source data stream and the destination data where the source data is preserved, regardless of whether or not all of the rows of the source data stream match with a corresponding row of the destination data. If a source row matches with a destination row, the result of the outer-join operation is the source columns and the destination columns of the joined rows from the respective data streams. If a source row does not match with any destination row, then the result of the outer-join operation consists of the column values of the source row, and NULL column values for the destination columns.

Figure 3:
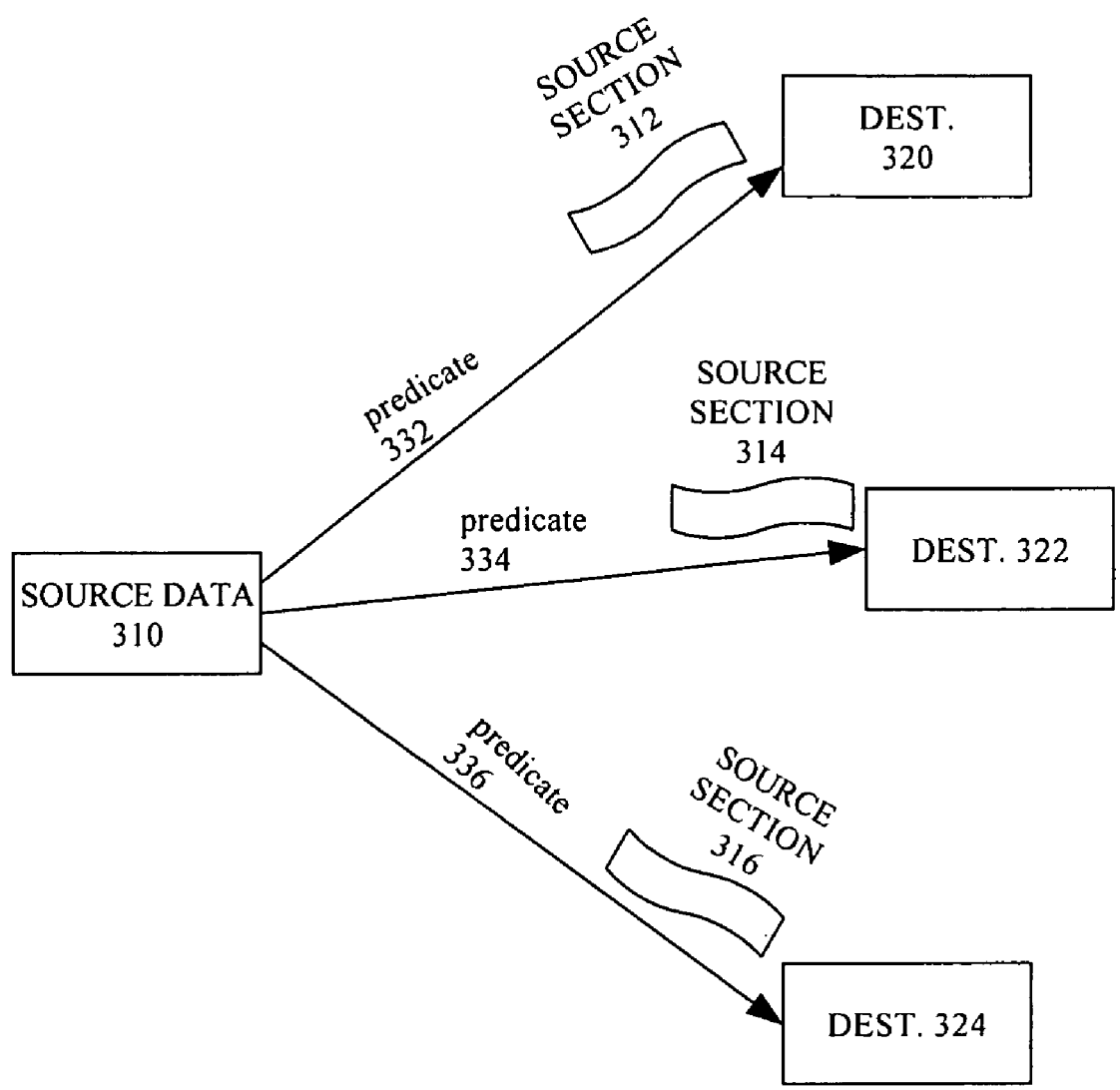
FIG. 3 is a block diagram illustrating a system where a source data stream is subjected to multiple MERGE operations to merge different portions of the source data stream with different destination tables.

According to another embodiment, different portions of the source data 210 may be merged with different destination tables in a series of MERGE operations. FIG. 3 illustrates fan-out of the source data 210 into multiple destination tables. The source data stream 310 may be subjected to multiple MERGE operations in order to merge different portions of the source data with a plurality of destination tables. In FIG. 3, the plurality of destination tables is provided by a first destination table 320, a second destination table 322, and a third destination table 324.

As described previously with FIG. 2, a plurality of MERGE operations may be performed using a single scan of source table. In an embodiment such as described in FIG. 3, different portions of the source data stream 310 may be subjected to a MERGE operation with a different one of the destination tables 320, 322, 324 respectively. The particular portion of the source data stream 310 that is merged with each destination table 320, 322, 324 may be dependent on the predicate specified for the MERGE operation between the source data stream 310 and the specified destination table.

For example, as shown in FIG. 3, a first section 312 (i.e. row 1, row 2) of source data stream 310 matching a first predicate 332 is merged with first destination table 320. A second source section 314 (i.e. row 1, row 2, row 3) of source data stream 310 matching a second predicate 334 is merged with second destination table 322. A third source section 316 (i.e. all of source data stream 310) matching a third predicate condition 336 is merged with third destination table 324. In this way, the multi-table merge may be performed using a single scan of the source data structure that yielded source data stream 310, except that different portions of that source data are merged with different destination tables 320, 322, 324. The different portions (which may or may not overlap) of the source data 310 may be identified from a stream or intermediate data structure that results from the scan of the source data structure.

In an embodiment, each predicate condition may be an "all" condition or a "first" condition. When an "all" is used, the result is that each designated unit (i.e. row) of source data stream 310 is matched with all of the predicates and is used by the MERGE operation of the matching predicates to merge that unit of the source data with the corresponding one of the destination tables 320, 322, 324. When a "first" condition is used, the result is that each designated unit (i.e. row) of source data stream 310 is used by the MERGE operation corresponding to the "first" predicate that it matches with and is disregarded by all subsequent predicates. The order in which the predicates are evaluated is the order in which the predicates appear in the statement. Therefore in the second set of instructions shown, if "all" is specified, then each source row is matched with each of the predicates at line 15, 55 and 95 and the corresponding merge is performed. On the other hand if "first" is specified a row is matched with predicate at line 15, if it matches, the corresponding merge is executed and the processing of the row ends, if it does not match, the row in matched with predicate in line 55 and so on.

A suitable syntax for performing an embodiment such as described in FIG. 3 is provided by a second set of instructions, illustrated below.

```
10*    merge <all/first> using <source>
15*    when <predicate 1>
20*        into <destination 1>
25*        on <sub-predicate 1>
30*            when matched then
35*                update
40*                    set<columns >
45*            when not matched then
50*                insert <columns >
55*    when <predicate 2>
60*        into <destination 2>
65*        on <sub-predicate 2>
70*            when matched then
75*                update
80*                    set <columns >
85*            when not matched then
90*                insert <columns >
95*    when <predicate 3>
100*       into <destination 3>
105*       on <sub-predicate 3>
110*           when matched then
115*               update
120*                   set <columns >
125*           when not matched then
130*               insert <columns >
```

The second set of instructions may be executed to implement an embodiment such as described in FIG. 3. For purpose of description, the second set of instructions will be described in the context of FIG. 3. The source data stream 310 results from scanning the source data structure, provided by the command of "using <source>" in line 10. The line 10 specifies whether the predicates 332, 334, 336 of the multi-MERGE operations are to be treated as type "all" or "first" predicates. The destination tables 320, 322, 324 are scanned by the "into" clauses in lines 20, 60, and 100. The MERGE operation performed for merging the portion of the source data 310 matching first predicate 332 is illustrated by lines 15–50. Likewise, the MERGE operation performed for merging the portion of the source data stream 310 matching second predicate 334 is illustrated by lines 55–90. The MERGE operation performed for merging the portion of the source data stream 310 matching the third predicate 336 is illustrated by lines 95–130. Each of the "on" clauses provided in lines 25, 65, 105 are to initiate a comparison between the matched source data stream 310 and each of the destination tables 320, 322, 324. The second set of instructions ensures that the "on" clauses are performed so as to preserve the scan of the source data stream 310. This enables the multiple MERGE operations between source data stream 310 and the destination tables 320, 322, 324 to be carried out using only the single scan of the source data structure.

Multi-Table Merge Operations with Source Augmentation

Figure 4:
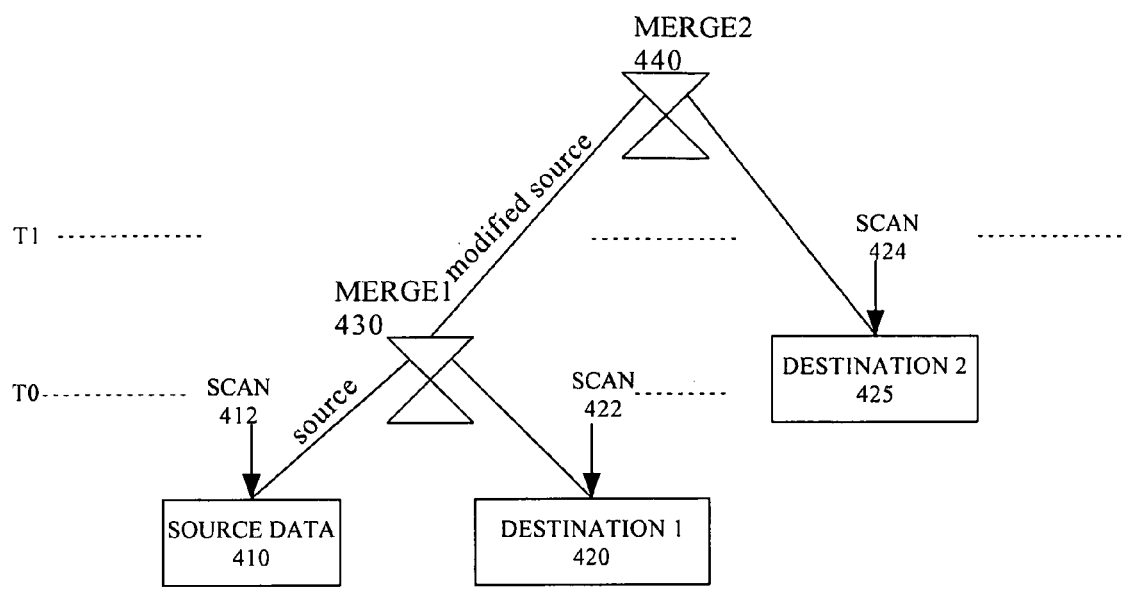
FIG. 4 illustrates a plan for performing a multi-table merge where a source data stream used in performing multiple MERGE operations is modified by one of the MERGE operations before another of the MERGE operations is performed.

FIG. 4 illustrates an embodiment where a single scan of a source data structure is used to yield source data stream for performing multiple MERGE operations with different destination data structures, while enabling the source data stream to be augmented by one MERGE operation before being fed into the subsequent MERGE operation.

In FIG. 4, the plan illustrates the manner in which source data stream 410 is merged into a first destination table 420 and then into a second destination table 425. At time T0, a scan 412 has been performed of a source data structure that results in source data stream 410. At time T0, a first destination scan 422 has also been completed of first destination table 420. Once the scans are complete, a first MERGE operation 430 merges source data stream 410 into the first destination table 420. The first MERGE operation 430 uses the source data stream 410 without modification to perform the first MERGE operation 430.

The source data stream 410 may introduce a new row into the first destination table 420 when the first MERGE operation 430 is performed. As an example, the new row may correspond to a new product. The first MERGE operation 430 causes the source data stream 410 to receive new values that are to be provided in a column of the destination table. The new values may, for example, correspond to an identification number of the product. These new values may be generated from the first destination table 420. Then when the second MERGE operation 440 is performed, the source data stream 410 includes the new values received from the first destination table 420. In this way, the source data stream 410 is augmented as a result of the first MERGE operation 430.

If first MERGE operation 430 is performed in the context of, for example, a star schema (see description accompanying FIG. 5), the destination table 420 will be altered by the MERGE operation, and the source data stream 410 may be augmented for subsequent MERGE operations. For example, the first MERGE operation 430 may generate a new column for source data stream 410 in response to the first MERGE operation being performed. This may occur when, for example, first destination table 420 adds a set of dimension values to source data stream 410 prior to another MERGE operation being performed on a different destination table which uses the augmented source data stream.

In one embodiment, a result of performing first MERGE operation 430 is that additional data is augmented to source data stream 410. In an example provided by FIG. 4, the second MERGE operation 440 is performed using the source data stream 410 after it is augmented as a result of the first MERGE operation 430. The MERGE operation merges some or all of the augmented source data stream 410 into the second destination table 425. However, the source data stream 410 is modified by the first MERGE operation 430 without performing another scan of the source data structure. Thus, the second MERGE operation 440 uses the scan 412 performed at time T0, and the second destination scan 424 of the second destination table 425 performed at time T1. No other scans of the source data structure is necessary other than the single scan 412 performed at time T0 in order to perform the second MERGE operation 440.

The process by which source data stream 410 is augmented by first MERGE operation 430 for second MERGE operation 440 may be repeated for subsequent MERGE operations. A third set of instructions is illustrated below (in abbreviated form) for implementing such MERGE operations.

```
10*   merge using <source>
20*     (merge using <source>
30*        when...
40*        else
50*        producing <modified source>)
```

The third set of instructions illustrated above provide for nesting one merge command into another merge command so that, for example, commands for executing the second MERGE operation 440 are executed using a return of the commands used to implement first MERGE operation 430. The third set of instructions may incorporate commands and concepts from other embodiments described herein. The result of the third set of instruction is that a nested MERGE operation, provided by lines 20–50, returns a value for the second merge command, initiated on line 10. This value corresponds to augmentations to the source data stream 410. The augmentation to the source data stream 410 is generated on line 50, with the "producing" clause. The source data stream generated after the MERGE operation is identified by the "producing" clause columns. The "producing" clause columns can be either source stream columns or destinations columns of the corresponding MERGE operation.

In database systems, for example, a star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are sometimes referred to as "fact tables", while the smaller tables are sometimes referred to as "dimension tables". Typically, a series of MERGE operations merge the source data stream into a series of dimension tables, and finally into a fact table. Each dimension table augments one or more dimension values to the source stream to be used by the MERGE operations on the other dimension tables and fact tables.

Figure 5:
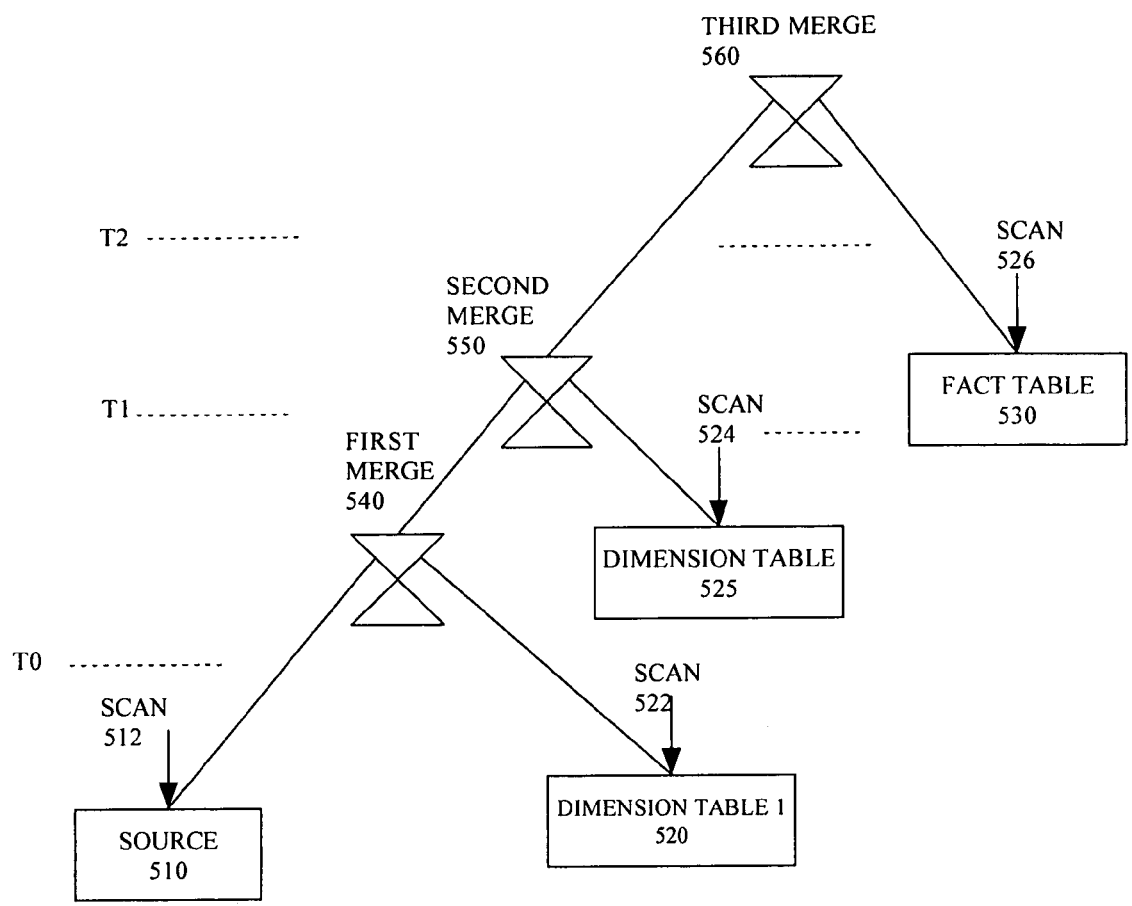
FIG. 5 illustrates implementation of an embodiment in a star-schema.

FIG. 5 illustrates a plan where an embodiment of the invention is implemented in the context of a "star schema". As with other embodiments, at time T0, a scan 512 of the source data structure is completed in order to obtain the source data stream, and a scan 522 of the first dimension table 520. A first MERGE operation 540 is performed to augment dimensional data (e.g. columns) from the first dimensional table 520 to the source data stream. At time T1, a scan 524 of the second dimension table 525 may be performed. The source data stream 510 with augmented data from the first dimension table 520 is merged into the second dimension table 525 using a second MERGE operation 550.

Once the series of MERGE operations are performed to combine the dimension tables with the source data stream 510, the source data stream with data augmented from the many dimension tables can be combined into fact table 530. At time T2, a scan 526 of the fact table 530 is performed. The source data stream 510 containing data augmented from prior operations with the dimension tables is then merged into the fact table 530.

Thus, FIG. 5 illustrates that an embodiment of the invention may be implemented in a star schema, where a single scan of a source data structure results in the source data stream that is then used for performing a series of MERGE operations. With each MERGE operation, the source data stream is augmented with data from one of the dimension tables, until a final MERGE operation combines the source data stream with the fact table.

Pipelined Merge Operations

Embodiments of the invention may be used to implement a "pipeline" in order to concurrently perform multiple MERGE operations that merge the source data stream into multiple destination tables. A "pipeline" refers to a mechanism where (i) all of a source data stream is subjected to each MERGE operation in a series of MERGE operations; (ii) sections of the source data stream are sequentially made available without buffering the source stream to each MERGE operation, so that with the passage of time, each section has been subjected to all of the MERGE operations; and (iii) the source data stream (including all of the augmentation) is pipelined through out all of the operations. In one embodiment, another characteristic of a pipeline is that sections of the source data stream are subjected to sequential MERGE operations in a designated order. Thus, when a pipeline is implemented, at (i) an initial time (T=0), the first section of the source data stream undergoes the first MERGE operation while no other section of the source data stream is subjected to any such operation; and (ii) at a final time (T=final), the last section of the source data stream undergoes the last MERGE operation while all other sections of the source data stream have already undergone all of the MERGE operations. At any intermediate time interval between T=0 and T=final, the first section of the source data stream may undergo a MERGE operation that is further along in sequence than the operation that the last section of the source data stream is being subjected to.

Figure 6:
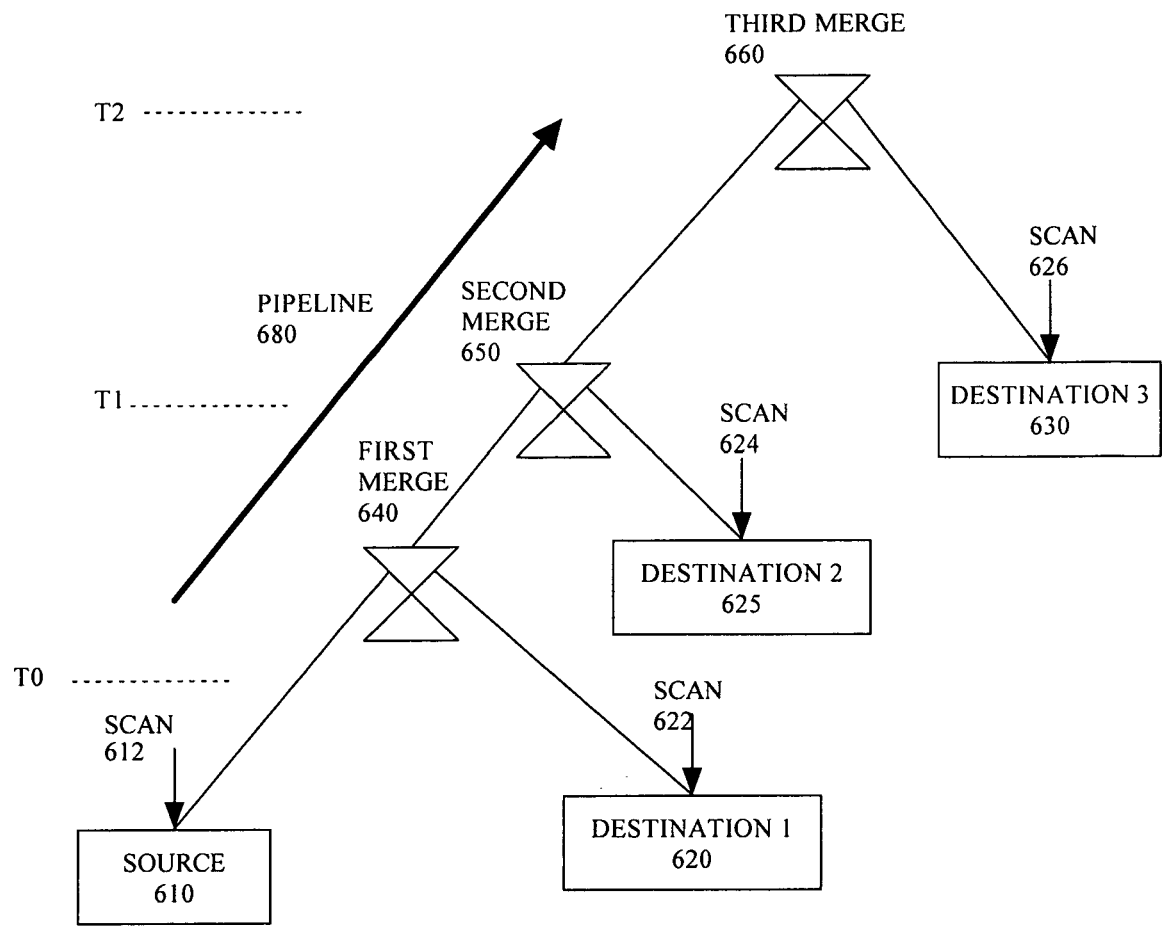
FIG. 6 illustrates a plan for providing a pipeline for enabling a source data stream to be concurrently merged into multiple destination data structures.

FIG. 6 illustrates a plan for providing a pipeline 680 for performing multiple MERGE operations using a source data stream obtained from a single scan of a source data structure. A scan 612 results in the source data stream 610. Implementing the pipeline 680 results in the source data stream 610 being structured into a sequential order that is fed into a series of MERGE operations that are also sequenced. The following chronology may be used to explain the pipeline:

Before T=0, the scan 612 that results in the source data stream 610 and the scan 622 of the first destination table 620 is completed.

At T=0, the first MERGE operation is initiated. A section of the source data stream 610 undergoes the first MERGE operation 640 with the first destination table 620. The section of the source data stream 610 that undergoes the first MERGE operation 640 is the first sequenced section of the source data structure. The remainder of the source data stream 610 does not undergo the first MERGE operation 640.

Before T=1, the scan 624 of the second destination structure 625 is completed.

At T=1, the first sequenced section of the source data stream 610 undergoes the second MERGE operation 650 to combine its data with the second destination table 625. Simultaneously, a second sequenced section of the source data stream 610 undergoes the first MERGE operation 640 to combine its data with the first destination table 620. The source data stream 610 other than the first and second sequenced sections do not undergo any MERGE operations.

Before T=2, a scan 626 of the third destination structure 630 is completed.

At T=2, the first sequenced section of the source data stream 610 undergoes the third manipulation operation 660 to combine its data with the third destination table 630. Simultaneously, (i) the second sequenced section of the source data stream 610 undergoes the second MERGE operation 650 to combine its data with the second destination table 625; and (ii) a third sequenced section of the source data stream undergoes the first MERGE operation 640 to combine its data with the first destination table 620. For purpose of explanation, it is assumed that no other sections of the source data stream 610 remain.

At T=3 (not shown in the plan), the first sequenced section of the source data stream 610 has undergone all of the MERGE operations. The other sequenced sections of the source data stream 610 of iterated to the next respective MERGE operation.

At T=4 (also not shown in the plan), the second sequenced section of the source data stream 610 has undergone all of the MERGE operations. The third sequenced section remains, and it is undergoing the third MERGE operation.

At T=5, all of the sequenced sections of the source data stream 610 have undergone all of the MERGE operations.

In order to implement pipeline 680, the MERGE operations are (i) non-blocking, and (ii) preserve the source data stream. In order to preserve the source data stream 610, an outer-join may be performed. This type of MERGE operation is "non-blocking" for the source data 610 because a particular section of the source table is not blocked from further use in other MERGE operations once the first MERGE operation 640 has been performed on that particular section.

FIG. 6 illustrates an embodiment where multiple MERGE operations may be performed concurrently, with only a single scan of the source data structure. Such an embodiment greatly improves performance of multiple MERGE operations.

In order to implement pipelined merge operation, all the operations, which are required to perform a MERGE operation at one node of the pipeline, should be non-blocking. Operations 640, 650, 660 in the context of FIG. 6 are non-blocking operations.

Lookup Node

A pipeline such as described above does not provide for altering the source data stream. But in certain applications like star-schemas, a pipeline is beneficial, and data from destination tables (the dimensional tables in the star schema) need to be passed on for use with other MERGE operations. In such applications, a look-up node may be implemented. The look-up node is a temporary data structure that maintains a set of data that is to augment the source data in subsequent MERGE operations.

The look-up node refers to a node that contains a temporary data structure that stores data from a destination table, and can augment the source data with the data contained in its data structure.

Figure 7:
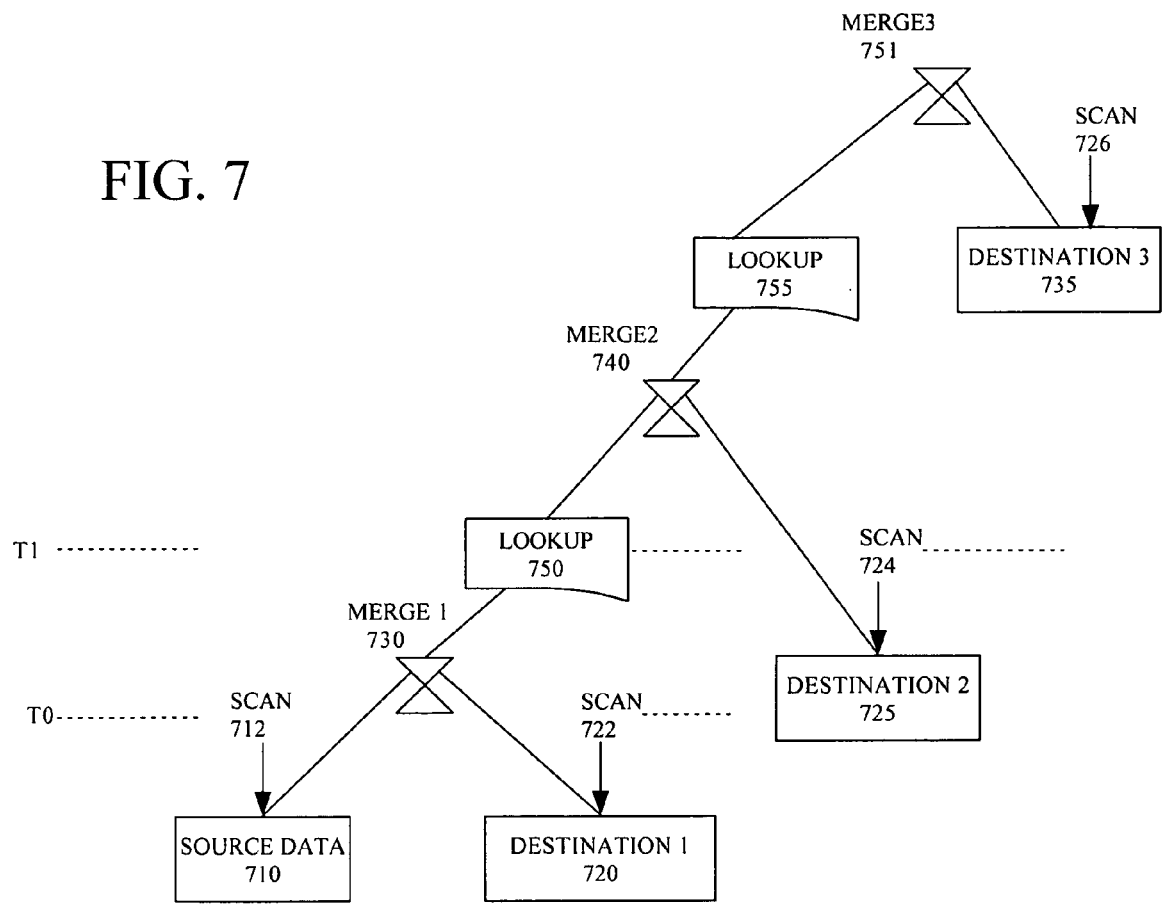
FIG. 7 is a plan that illustrates use of a lookup node to enable augmenting source data in between MERGE operations when the source data is to be used for consecutive MERGE operations, under an embodiment of the invention.

FIG. 7 illustrates a plan for implementing a look-up node, under an embodiment of the invention. the plan illustrates a first MERGE operation 730 to combine data from a source data stream 710 with a first destination table 720. In order to perform the first MERGE operation 730, a source table scan 712 is performed on a source data structure to yield the source data stream 710, and a first destination table scan 722 is performed on the first destination table 720. The source table scan 712 and the first destination table scan 722 may be completed by time T0. The source table scan 712 is performed one time, and subsequently used for both the first MERGE operation 730 and the second MERGE operation 740.

In an application such as a star schema, source data 710 is augmented with modified data from each of the successive destination tables. Thus, the second MERGE operation 740 receives augmented source data 710, and the augmented source data is used for the second MERGE operation 740. In order to perform the second MERGE operation 740, a second destination table scan 724 is performed on the second destination table 725. But the source table scan 712 completed by time T0 is used for the source data 710 when performing the second MERGE operation 740. Thus, a single scan of source data 710 is used to perform multiple-MERGE operations, even when source data 710 has been augmented.

In an embodiment, a first lookup node 750 provides a mechanism by which the source table scan 712 is preserved and augmented. Specifically, the first look-up node 750 stores data from the first destination table 720 that has been modified as a result of the first MERGE operation 730. Once the first MERGE operation 730 is complete, the first look-up node 750 augments the modified data from the first destination table to the source data for use with the second MERGE operation.

Likewise, the second look-up node 755 stores data from the second destination table 725 that has been modified as a result of the second MERGE operation 740. The modified data in the second look-up node may augment the source data 710, which may already be augmented from the first look-up node 750. Thus, the third MERGE operation 751 is performed using source data 710, augmented with modified data from the first destination table 720 and the second destination table 725.

According to one embodiment, lookup nodes 750, 755 are only used when the plan for performing multiple MERGE operations calls for augmenting the source data 710. Thus, the MERGE operations 730, 740 are considered as separate and independent operations from the lookup nodes 750, 755 and the operations performed therein.

Figure 8:
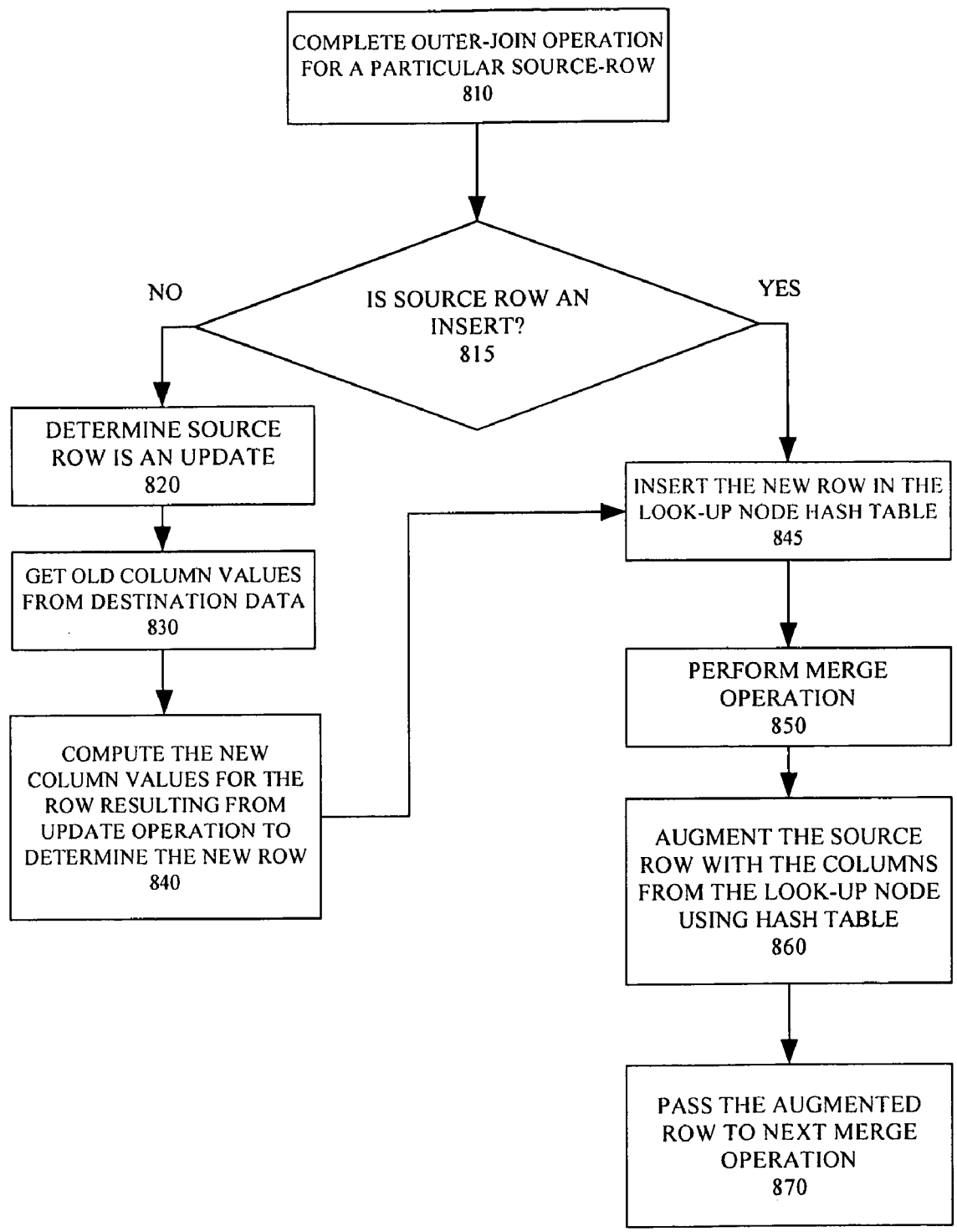
FIG. 8 illustrates a method for using a lookup node to augment source data as a result of performing a MERGE operation for use with a subsequent MERGE operation.

FIG. 8 illustrates a method for implementing a look-up node such as described in FIG. 8 for use with the MERGE operation. A method such as described in FIG. 8 is to be performed for a specific node, such as first look-up node 750 in FIG. 7.

In step 810, the outer-join operation of the first MERGE operation 830 is completed. Step 815 makes a determination as to whether a source row that is to be used in the MERGE operation is to be an INSERT.

If the determination is negative, step 820 provides that the source row is to be an UPDATE. Step 830 provides that old columns from the first destination table 820 are fetched. Step 840 provides that new column values are computed for the row resulting from executing an UPDATE between the source row and the identified destination data.

Following a positive determination in step 815, or following step 840, the result is that there is a new row for the first destination table 820. Step 845 provides that the new row is inserted into the first look-up node hash table. Step 850 provides that the MERGE operation is performed as the first MERGE operation.

In step 860, the source row is augmented with columns from the first look-up node, which are stored in the hash table of that node. These columns represent changed values from the first destination table.

Step 870 provides that the augmented source row is passed on to the next MERGE operation. In FIG. 8, this may correspond to second MERGE operation 840.

Hardware Overview

Figure 9:
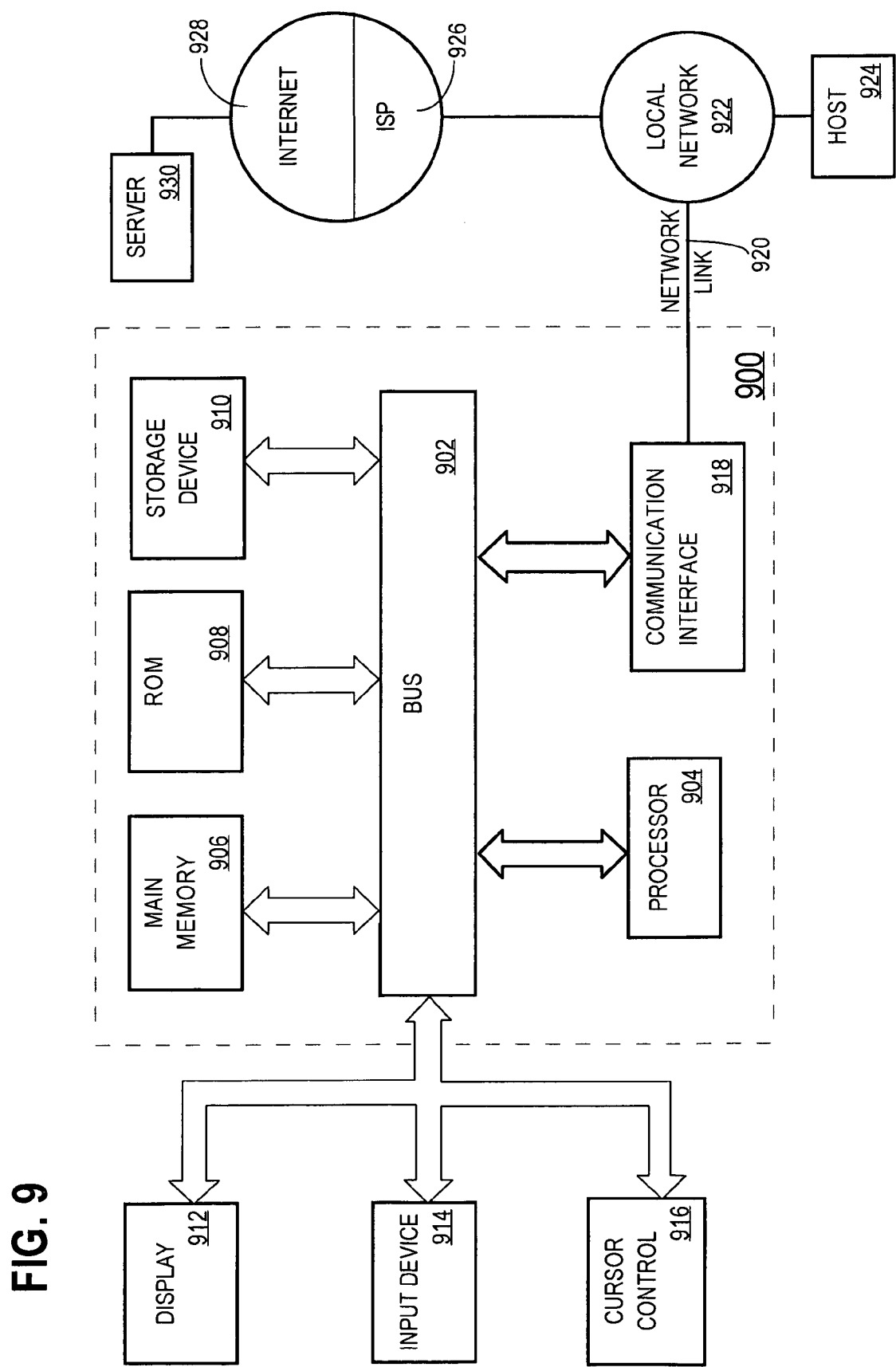
FIG. 9 is a block diagram illustrating hardware of a computer system for use with an embodiment of the invention.
Figure 10:
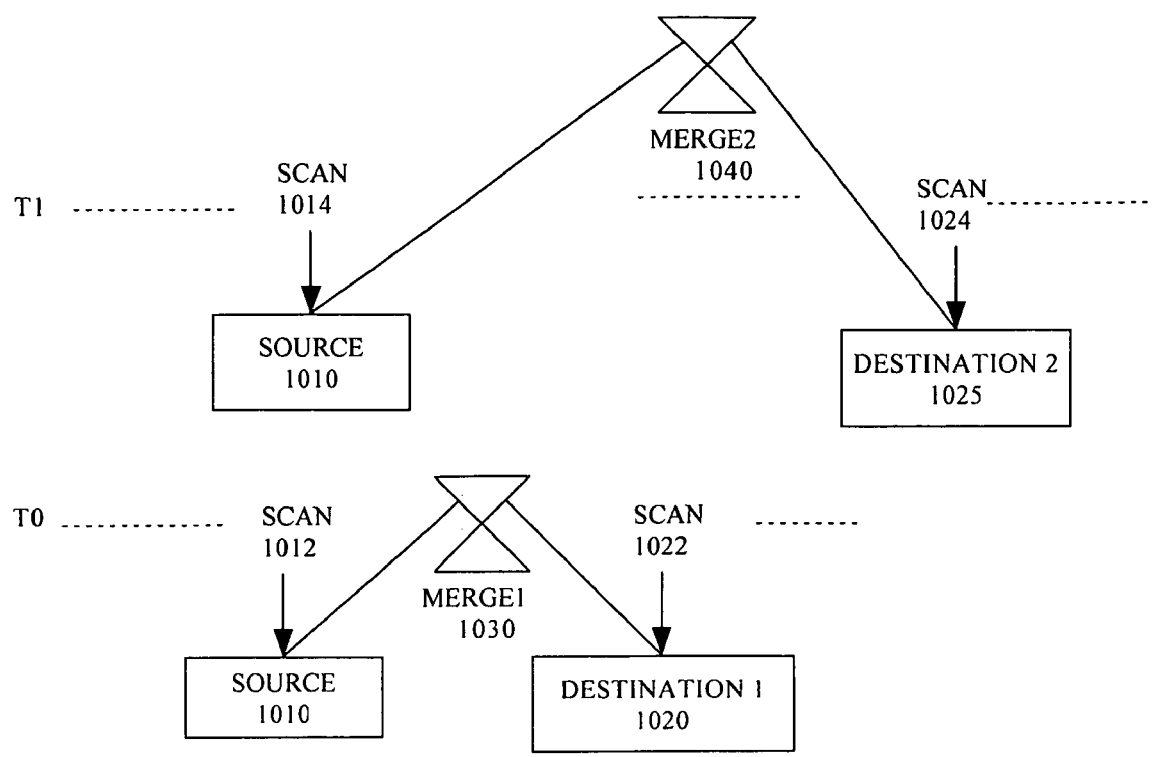
FIG. 10 is a prior art plan that illustrates data from a source table being merged with multiple destination tables.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of combining data in a database system, the method comprising:
    receiving a database command, in the Structured Query Language (SQL), that includes a first MERGE operator that specifies a first merge operation and a second MERGE operator that specifies a second merge operation;
    wherein, within the database command, the first MERGE operator is located in a position, relative to the second MERGE operator, that indicates that
        (a) the first merge operation is nested relative to the second merge operation, and
        (b) results of the first merge operation are to be used as a source stream of the second merge operation;
    executing the database command within the database server by performing the steps of:
        obtaining source data from a source data structure by performing a single scan of the source data structure;
        without performing any additional scans of the source data structure, performing a plurality of merge operations including the first merge operation and the second merge operation;
    wherein the first merge operation produces a first result, and wherein the second merge operation produces a second result by merging the first result into a destination data structure.

2. The method of claim 1, wherein the second merge operation uses the first result to modify data in the destination data structure.

3. The method of claim 1, wherein the source data structure and the destination data structure are each a relational table.

4. The method of claim 1, wherein:
    within the database command, the second MERGE operator is located in a position, relative to a third MERGE operator, that indicates that
        (a) the second merge operation is nested relative to a third merge operation, and
        (b) results of the second merge operation are to be used as a source stream of the third merge operation; and
    performing the plurality of merge operations further includes executing a third merge operation to merge the second result into at least a second destination data structure.

5. The method of claim 1, wherein performing a plurality of merge operations using the source data includes using an intermediate data structure to store said first result and said second result.

6. A computer-readable storage medium carrying one or more sequences of instructions which, when executed by one or more processors, causes the one or more processors to perform the method recited in claim 1.

7. A computer-readable storage medium carrying one or more sequences of instructions which, when executed by one or more processors, causes the one or more processors to perform the method recited in claim 2.

8. A computer-readable storage medium carrying one or more sequences of instructions which, when executed by one or more processors, causes the one or more processors to perform the method recited in claim 3.

9. A computer-readable storage medium carrying one or more sequences of instructions which, when executed by one or more processors, causes the one or more processors to perform the method recited in claim 4.

10. A computer-readable storage medium carrying one or more sequences of instructions which, when executed by one or more processors, causes the one or more processors to perform the method recited in claim 5.

* * * * *